United States Patent Office 2,972,984
Patented Feb. 28, 1961

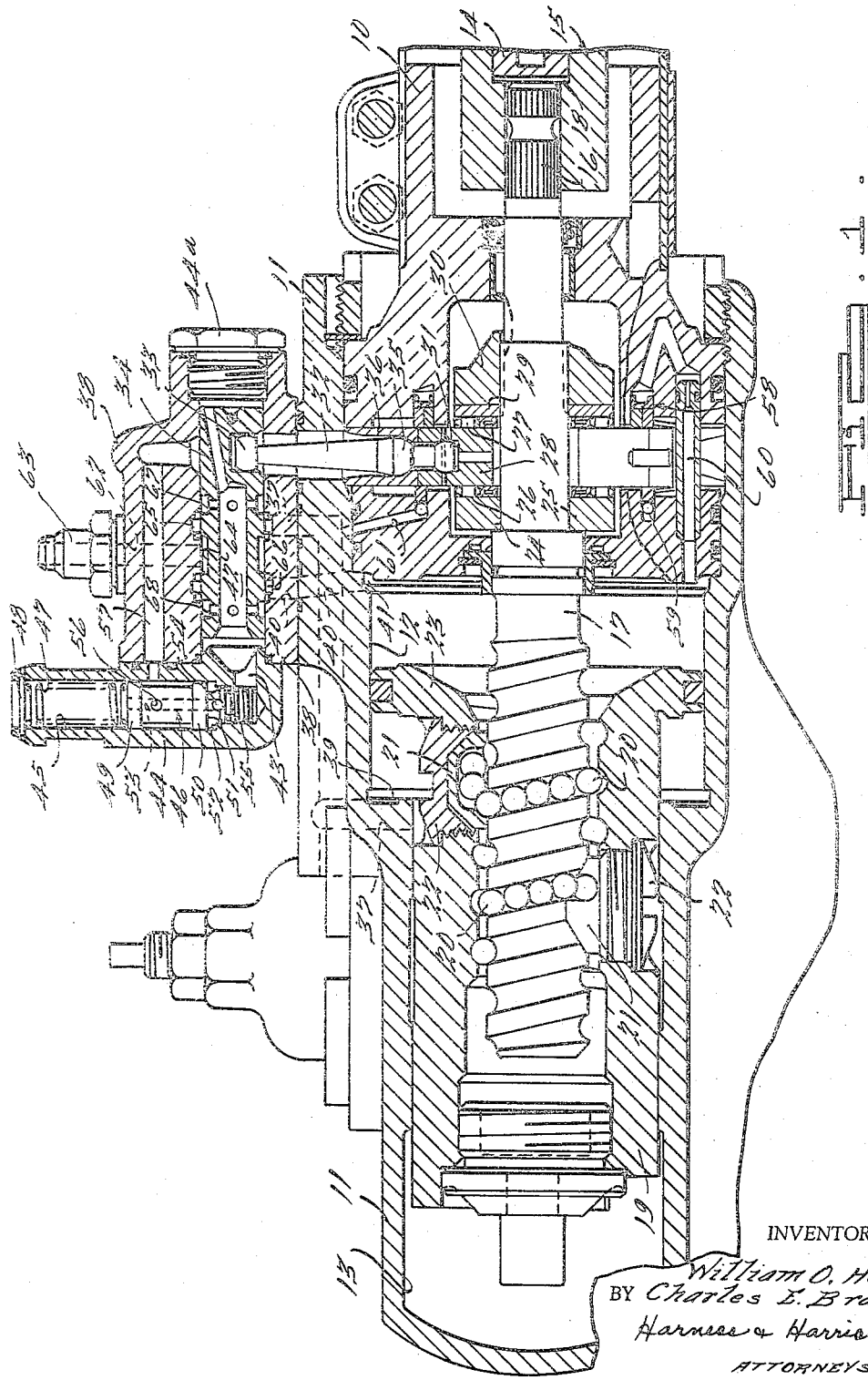

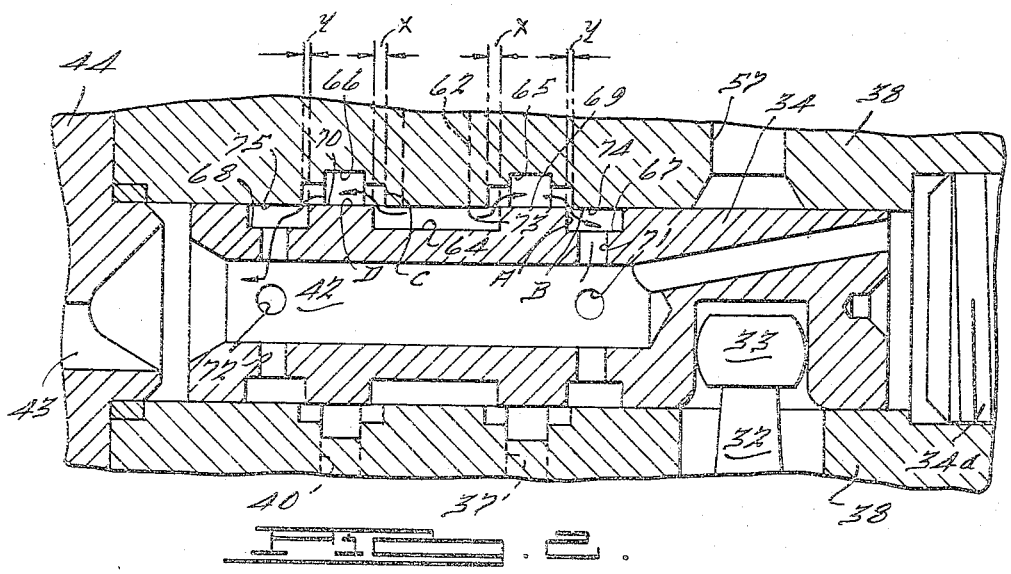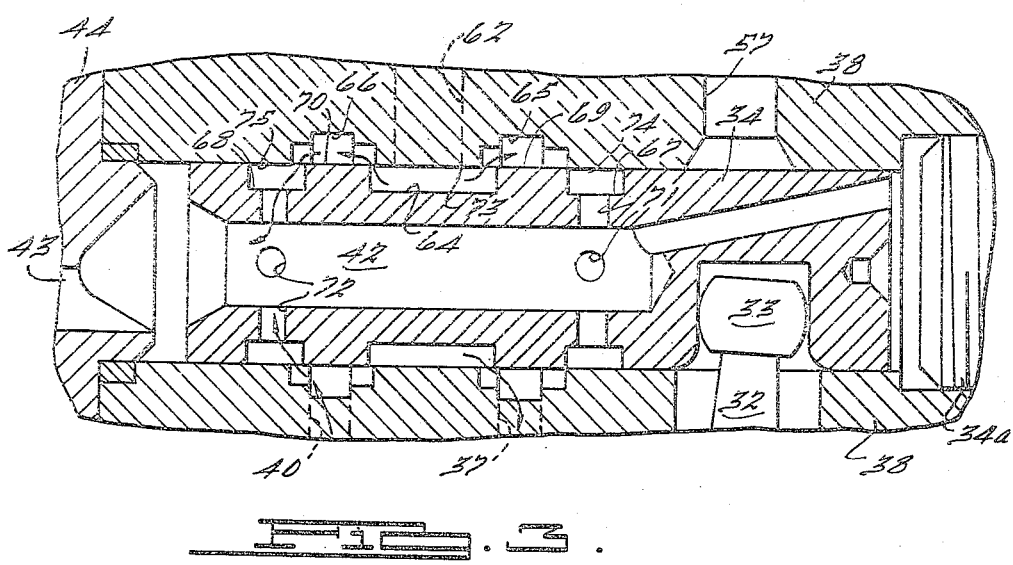

2,972,984
STAGGERED LAND SPOOL VALVE

William O. Heyn, Roseville, and Charles E. Brady, Oak Park, Mich., assignors to Chrysler Corporation, Highland Park, Mich., a corporation of Delaware Filed Jan. 23, 1959, Ser. No. 788,542

10 Claims. (Cl. 121—46.5)

This invention relates to hydraulic slide valves particularly of the double-acting land type employed in comparatively high pressure fluid applications, as for example in automotive power steering units where valve noise is objectionable.

Conventional double-acting spool-type valves having a pair of working parts are provided with lands arranged symmetrically to close one working port to exhaust and the other to the inlet pressure simultaneously. In consequence, high velocity fluid flow into the exhaust port and said other working port develops during valve operation and causes unbalanced axial forces on the lands of the shiftable spool. Axial vibrations of the spool result, which are transmitted to the latter's mechanical linkage with undesirable noise and erratic valve operation. Precise production tolerances must thus be maintained in order to minimize the foregoing objections.

An important object of the present invention is to provide an improved double-acting spool-type hydraulic valve which avoids the foregoing objections and achieves a superior stabilized valve action that enables appreciable latitude in the use of semi-flexible or resilient valve actuating mechanisms while at the same time reducing variations in the operating characteristics between different valves manufactured by mass production methods and also avoiding the necessity for repeated valve adjustments.

Another and more specific object is to provide a double-acting spool valve of the above character having a pair of working ports arranged symmetrically in a valve housing between two exhaust ports in a shiftable valve spool and spaced by a common inlet port in the spool, such that inlet fluid passes through both working ports into the two exhaust ports when the shiftable spool is in a neutral position. The axial extent of the opening between each working port and its adjacent exhaust port is less than the axial extent of the opening between each working port and the inlet port. Thus upon shifting of the valve spool in either direction from the neutral position toward one of the exhaust ports, that port will be closed from the adjacent working port prior to closing of the other working port from the inlet port. The inlet pressure will be bypassed to the exhaust port adjacent the aforesaid other working port until after the one working port is closed to exhaust. By the time the bypass to exhaust through said other working port is closed to enable buildup of the inlet pressure in the one working port, the latter is closed to exhaust and unbalanced transient axial forces on the valve spool are avoided.

Other objects of this invention will appear in the following description and appended claims, reference being had to the accompanying drawings forming a part of this specification wherein like reference characters designate corresponding parts in the several views.

Figure 1 is a longitudinal section through an automobile hydraulic power steering mechanism controlled by a spool valve embodying the present invention.

Figure 2 is an enlarged fragmentary sectional view of the valve of Figure 1, showing the valve spool in the neutral position.

Figure 3 is a view similar to Figure 2, but showing the valve spool shifted to the right whereat the right hand working port is closed to exhaust, but prior to closing the inlet pressure from exhaust via the left-hand working port.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a portion of an automobile hydraulic power steering mechanism is illustrated comprising a steering shaft housing 10 secured by suitable seals to a piston housing 11. The latter is provided with an interior cylindrical portion 12 opening into a leftward extension 13. The vehicle steering shaft 14 which has one end secured to the customary steering wheel, not shown, is connected by means of a flexible coupling indicated generally at 15 to the splined end 16 of a worm shaft 17, so that rotation of the steering shaft 14 will impart a like rotation to the worm shaft 17. The latter is provided with limited axial lost motion with respect to the shaft 14 by reason of the axial space 18 adjacent the spline 16.

Mounted on the left end of the worm shaft 17 is a nut member 19 operably connected by means of a steering linkage, not shown, to the dirigible front wheels of the vehicle. The left end of the nut member 19 rides within the extension 13 and has an internal helical groove mating with a complementary groove in the worm shaft 17 so as to carry two sets of spherical balls 20 arranged to enable comparatively friction-free driving engagement between the elements 17 and 19.

Associated with each set of balls 20 is a transfer port 21 provided in the side wall of the member 19, each transfer port being adapted to conduct the balls through the body of the member 19 from one to the next preceding convolution of the helical groove in the worm shaft 17, so as to achieve endless recirculation of the balls at a fixed location with respect to the member 19 upon rotation of the worm shaft 17. Each transfer port 21 is retained in position within a recess in member 19 by a capping screw 22. The right end of member 19 comprises an integral piston 23 reciprocable in the cylindrical portion 12.

Within the housing 10, the shaft 17 is provided with a shoulder 24 against which abuts an annular spacer 25. Two sets of annularly arranged needle bearings 26 and 27 spaced by an annular lever actuator 28 are maintained in axially stacked relation around the shaft 17 and against spacer 25 by means of a washer 29 and nut 30. A portion of the actuator 28 is provided with a radially opening socket for the inner ball end 31 of a valve operating lever 32. The latter extends radially through the housings 10 and 11 and terminates in an outer ball end 33 suitably seated in a socket in a cylindrical valve spool 34. Between the ball ends 31 and 33 is an integral spherical bearing portion 35 of the lever 32 which is pivotally supported within the radially opening recess of a bearing member 36 fixed with respect to the housing 10.

By virtue of the structure described thus far, manual clockwise steering movement of the shaft 14, looking from right to left in Figure 1, tends to move piston 23 to the right. Road reaction resisting movement of the piston 23 tends to shift shaft 17 and valve actuating member 28 leftward to the extent permitted by the axial clearance between member 28 and housing 10. In consequence, lever 32 is pivoted clockwise about the spherical portion 35 to shift spool valve 34 to the right. This action as explained below directs high pressure fluid into working conduit 37 which extends through a valve housing 38 and the piston housing 11 and opens at 39 into cylinder 12 at the left side of piston 23, thereby to move the latter to the right and assist the manual steering effort. Simultaneously working conduit 40, which extends through valve housing 38 and piston housing 11 and opens at 41 into cylinder 12 at the right side of piston 23, is connected to exhaust conduit 42. The latter extends axially leftward in valve spool 34 and opens into exhaust duct 43 in an end cap member 44 for the left end of valve housing 38. The right end of valve housing 38 is closed by threaded cap screw 44a.

An exhaust duct 45 in communication with duct 43 extends within cap member 44 and contains a back pressure valve 46. The exhaust back pressure is determined by the force of spring 47 seated under compression between a fixed retainer 48 and the upper end of valve 46. Upper and lower guide lands 49 and 50 of the valve 46 guide the latter's vertical shifting movement within duct 45. Below land 50 is a valving land 51 of the va've 46 which blocks upward flow of exhaust fluid in duct 45 when land 51 is below the level of shoulder 52 formed at the juncture with a lower reduced portion of duct 45.

Valve 46 is also provided with an axial bore 53 open at its upper end to duct 45 and also opening radially at 54 between guide land 50 and the lower edge of valving land 51. Spring 55 seated between the lower end of valve 46 and a portion of the end cap 44 prevents bottoming of valve 46 and minimizes valve noise. Between lands 49 and 50 is a radial opening 56 which provides communication with the central bore 53 and a drainage duct 57 extending through the side walls of housings 44 and 38 to the recess provided for lever 32. It is apparent that when the exhaust pressure on the underside of valve 46 exceeds a predetermined comparatively low value, valve 46 is forced upward against the biasing pressure of spring 47 to enable passage of exhaust fluid upwardly around land 51 and through ducts 54 and 53.

In order to achieve reaction to steering movement proportional to the hydraulic pressure required to assist the steering movement, and therefore proportional to the road reaction, annular reaction elements indicated generally at 58 and 59 extend around shaft 17 in housing 10 at opposite sides of lever actuator 28. The reaction elements 58 and 59 are urged against the right and left sides respectively of actuator member 28 by hydraulic pressure conveyed to the right and left sides respectively of piston 23 by reaction ducts 60 and 61. Reaction duct 60 extends from cylinder 12 at the right side of piston 23 to the right side of reaction member 58. Reaction duct 61 extends from the left side of reaction member 59 to conduit 37, which in turn communicates with cylinder 12 at the left side of piston 23. The foregoing structure may be conventional and is accordingly not described in further detail.

Fluid pressure is supplied to the system by means of a fitting 63 which is connected with a fluid inlet duct 62 opening into an annular groove or inlet port 64 formed centrally in the outer surface of the spool 34. The groove 64 spaces a pair of annular working ports or grooves 65 and 66 formed in the cylindrical bore of fixed valve housing 38 which closely confines the slidable spool 34. The ports 65 and 66 are arranged symmetrically between a pair of annular exhaust grooves or ports 67 and 68, Figure 2, formed in the outer surface of the spool 34. A pair of spool lands 69 and 70, Figures 2 and 3, symmetrically spaces groove 64 from grooves 67 and 68 respectively. The working ports or grooves 65 and 66 connect with the conduits 37 and 40 respectively. The exhaust grooves or ports 67 and 68 are connected by means of ducts 71 and 72 respectively to exhaust conduit 42. A centrally arranged fixed annular land 73 of housing 38 between the working ports 65 and 66 confronts the groove 64 and has the inlet duct 62 extending therethrough. Also fixed annular lands 74 and 75 of the valve housing 38 extend endwise from the grooves 65 and 66 respectively and confront grooves 67 and 68 respectively.

The various lands and grooves or ports are arranged so that when spool 34 is at its neutral position shown in Figure 2, inlet port 64 will be located symmetrically between ports 65 and 66 and the openings therebetween will both be the same and have the axial dimension $x$. Likewise the opening between ports 65 and 67 will be the same as the opening between ports 66 and 68, both having the axial dimension $y$ which is less than the dimension $x$ by several thousandths of an inch. In this regard in the high pressure system shown, the various clearances provided for the purpose of enabling lost motion for shaft 17, and the differences between the dimensions $x$ and $y$, are exaggerated for the sake of illustration.

When spool 34 is in the neutral position, Figure 2, inlet fluid from duct 62 enters port 64 and is thence short-circuited or bypassed to exhaust 42 via the passages 65, 57, and 71 and also via passages 66, 68, and 72. Accordingly only the slight exhaust back pressure determined primarily by spring 47 exists in the working ports 65 and 66 at opposite sides of piston 23. When the axially shiftable spool 34 is moved progressively to the right toward the position illustrated in Figure 3, as for example by operation of lever 32, the openings between ports 64 and 66 and also between ports 65 and 67 progressively close.

If the axial distance $x$ between lands 70 and 73 is the same as the axial distance $y$ between lands 69 and 74, working port 66 will be closed from the pressure of inlet port 64 simultaneously with the closing of working port 65 from exhaust port 67. The inlet pressure in port 64 will then rise and the velocity of fluid flow between ports 65 and 67, and also between ports 64 and 66, as indicated by the arrows, will increase appreciably prior to closing of the communication between ports 65 and 67. In consequence of the resulting high velocity fluid flow, unbalanced low pressures will develop at the regions A, B, C, and D, Figure 2. The low pressure regions B and D will be balanced radially, but the low pressure regions A and C will be unbalanced axially. The unbalanced force due to the low pressure region C will act to the left on the fixed valve body 38 and will have no effect on the valve spool 34. The unbalanced force due to the low pressure region A will act directly on the shiftable spool 34 and attempt to urge the latter to the right. Where the valve spool 34 is activated by a linkage as shown having limited resiliency, the unbalanced force at A will cause axial vibrations which result in undesirable noise and erratic valve operation, as in conventional valves of the foregoing type. Similar noise and vibration problems exist when the spool valve is shifted to the left, except that the low pressure regions are on correspondingly opposite lands and the unbalanced force on the valve spool land 70 acts to the left.

It is to be noted that by virtue of the axial openings $y$ being less than the openings $x$, upon the aforesaid shifting of spool 34 to the right, working port 65 will be closed from exhaust port 67 prior to the closing of working port 66 from inlet port 64, Figure 3, and while the inlet pressure is still bypassed to exhaust via passages 66, 68, and 72. In consequence, working port 65 will be closed from the exhaust port 67 prior to the buildup of inlet pressure in the system, so that high velocity fluid flow from port 65 to port 67 and a consequent unbalanced pressure force at A on the spool 34 are avoided. Upon continued shifting of spool 34 to the right, inlet port 64 will be progressively closed from exhaust via port 66, and inlet pressure will rise in working port 65 and duct 37 to cause rightward shifting of piston 23. Cylinder 12 at the right side of piston 23 will be connected to exhaust by duct 40 and working port 66.

Similarly upon shifting of spool 34 to the left, working port 66 will be closed to its associated exhaust port 68 prior to the closing of inlet port 64 to exhaust via passages 65, 67, and 71. Thus port 66 will be closed from its exhaust port 68 prior to pressure buildup in the inlet port 64, such that high velocity fluid flow between ports 66 and 68 and a consequent unbalanced axial pressure force acting to the left on land 70 are avoided.

In addition to the Bernoulli effect resulting in an unbalanced force at A, for example upon the flow of high velocity fluid from port 65 into port 67, it has been found that the change in momentum of fluid flowing from port 64 upon rightward movement of spool 34 results in an unbalanced dynamic force against the left edge of port 64 opposing the aforesaid movement. Such a force tends to dampen axial vibratory movement of spool 34 and is thus cooperable with the above described staggered relationship of the closing of the ports immediately to the right of the lands 69 and 70 to effect a comparatively noiseless and smoothly operating valve.

In the above regard, it is to be noted that the results of the present invention may be obtained with many other types of land and port arrangements provided that the high velocity flow into a cavity or port in the movable spool element from a high pressure source is avoided, as for example into port 67 upon rightward shifting of the spool 34. Thus where such a cavity in the valve spool exists, an unbalanced force on the valve spool resulting from the Bernoulli effect is avoided. It is also important that where a port such as inlet port 64 is provided in the movable valve spool, the change in momentum of the fluid flowing out of such a port must oppose the movement of the spool.

We claim:

1. In a valve for a fluid system having inlet and exhaust ports, the combination of fixed and shiftable valve members cooperable to provide a working port, separate valve means on said members for connecting said working port with said exhaust port by separate paths and also for connecting said working and inlet ports when said shiftable valve member is at one position with respect to said fixed member, said valve means being arranged to close one of said paths connecting said working and exhaust ports and to connect said working and inlet ports upon shifting of said shiftable member in one direction from said one to a second position with respect to said fixed member, and to close both of said paths connecting said working and exhaust ports and to connect said working and inlet ports upon continued shifting of said shiftable member in said one direction from said second to a third position with respect to said fixed member, thereby to maintain communication between said working and exhaust ports via the other of said paths until after said one path is completely closed.

2. In a valve for a fluid system having inlet and exhaust ports, the combination of fixed and shiftable valve members cooperable to provide a working port, separate valve means on said members for connecting said working port with said exhaust port by separate paths and also for connecting said working and inlet ports when said shiftable valve member is at one position with respect to said fixed member, said valve means being arranged for progressively closing said paths connecting said working and exhaust ports and for progressively increasing the extent of communication between said working and inlet ports upon shifting of said shiftable member from said one to another position with respect to said fixed member, one of said valve means being arranged to close one of said paths during said shifting prior to the closing of the other of said paths, thereby to maintian said working port in communication with said exhaust port until after said one path is completely closed.

3. In a valve for a fluid system having inlet and exhaust ports, the combination of fixed and shiftable valve members having cooperating lands and recesses to provide a working port, said lands and recesses being arranged for connecting said working port with said exhaust port by separate paths and also for connecting said working and inlet ports when said shiftable valve member is at one position with respect to said fixed member, said lands and recesses being also arranged to close one of said paths connecting said working and exhaust ports and to connect said working and inlet ports upon shifting of said shiftable member in one direction from said one to a second position with respect to said fixed member, and to close both of said paths connecting said working and exhaust ports and to connect said working and inlet ports upon continued shifting of said shiftable member in said one direction from said second to a third position with respect to said fixed member, thereby to maintain communication between said working and exhaust ports via the other of said paths until after said one path is completely closed.

4. In a valve for a fluid system having inlet and exhaust ports, the combination of fixed and shiftable valve members cooperating to provide a working port, said shiftable member having a recess in communication with said exhaust port, said working and inlet ports being in communication with said exhaust port when said shiftable member is at one position with respect to said fixed member, said fixed member having land means arranged to progressively close said working and inlet ports from said recess and exhaust port and also to progressively increase the extent of communication between said inlet and working ports upon progressive shifting of said shiftable member from said one to another position with respect to said fixed member, said land means being arranged to close said recess from said inlet and working ports prior to the closing of said working port to said exhaust port and thus prior to the maximum pressure buildup in said working port.

5. In a valve for a fluid system having inlet and exhaust ports, the combination of fixed and shiftable valve members cooperating to provide a working port, said shiftable member having a first recess in its side wall in communication with said exhaust port, said working and inlet ports being in communication with said exhaust port when said shiftable member is at one position with respect to said fixed member, said fixed member having a land extending in one direction from an edge of said first recess, a second recess in said fixed member extending from said land oppositely from said direction and being in communication with said working port, said land being cooperable with said edge to close said first recess from said working and inlet ports upon movement of said shiftable member in said one direction to a second position, and other land means on said members cooperable to connect said inlet and exhaust ports when said shiftable member is at said second position, thereby to enable closing of said first recess from said working and inlet ports while said working port is in communication with said exhaust port, said other land means being cooperable to close said working and inlet ports from said exhaust port upon shifting of said shiftable member in said one direction from said second to a third position.

6. In a valve for a fluid system having inlet and exhaust ports, the combination of fixed and shiftable valve members, a pair of lands on said shiftable member spaced by a central recess in communication with said inlet port, a pair of lateral recesses in said shiftable member extending endwise of said pair of lands respectively and being in communication with said exhaust port, a pair of working ports in said fixed member and associated with said lateral recesses respectively, said working ports being in communication with said inlet port when said shiftable member is at a central position, a pair of lateral land portions on said fixed member laterally of said working ports respectively and cooperable with said lands to close one or the other of said lateral recesses from its associated working port upon endwise movement of said shiftable member in one direction or the opposite respectively from said central position, a pair of central land portions on said fixed member confronting said central recesses and cooperable with said pair of lands respectively to progressively open to said inlet one or the other of said working ports associated with said one or the other of said lateral recesses respectively upon said endwise movement of said shiftable member in said one direction or the opposite respectively and simultaneously to progressively close said other and the one of said working ports from said inlet, said lands and land portions being arranged to close said one recess from said working port prior to the closing of said other working port from said inlet port upon said movement of said shiftable member in said one direction, and to close said other recess from said other working port prior to the closing of said one working port from said inlet port upon said movement of said shiftable member in said opposite direction.

7. In a valve for a fluid system, a fixed member and an axially shiftable member, a pair of working ports arranged symmetrically in said fixed member between two exhaust ports in said shiftable member when the latter is at a neutral position, a pair of lands on said shiftable member and confronting said working ports, said lands being arranged symmetrically with respect to said exhaust ports and being spaced by a central inlet port in said shiftable member, a pair of lateral lands on said fixed member confronting said exhaust ports respectively and extending axially endwise of said members from said working ports respectively, and a pair of intermediate land portions on said fixed member confronting said central inlet port and extending from said working ports oppositely from said lateral lands, said working ports opening into said central inlet port and said exhaust ports respectively when said shiftable member is at said neutral position, the axial dimension of the opening between each working port and said inlet port being the same and being greater by an equal amount than the axial dimensions of the openings between each working port and its associated exhaust port when said shiftable member is in said neutral position.

8. In a valve for a fluid system having high pressure and low pressure ports, the combination of fixed and shiftable valve members, lands on said members defining a recess in said shiftable member in communication with said low pressure port when said shiftable member is at one position, said lands being arranged to provide communication between said recess and a fluid source in communication with both said low pressure and high pressure ports when said shiftable member is at said one position and to close said recess to said source progressively upon movement of said shiftable member to a second position while maintaining said source in communication with said low pressure port.

9. In a double-acting valve for a fluid system having high pressure and low pressure ports, the combination of fixed and shiftable valve members, lands on said members defining a pair of recesses in said shiftable member spaced in the direction of shifting thereof and being in communication with said low pressure port, means for connecting said high pressure port with said low pressure port comprising said lands arranged to provide communication between said recesses and high pressure port when said shiftable member is at an intermediate position, said lands being also arranged to close said communication between said high pressure port and one or the other of said recesses progressively and to maintain said high pressure port in communication with the low pressure port through said other or one recess respectively upon movement of said shiftable member in one direction or the other from said intermediate position, thereby to close the communication between said high pressure port and said one or the other of said recesses respectively while said high pressure port is still in communication with said low pressure port.

10. In a double-acting valve for a fluid system having high pressure and low pressure ports and two working ports, the combination of fixed and shiftable valve members, lands on said members defining a first pair of recesses in said fixed and shiftable members respectively and also defining a second pair of recesses in said fixed and shiftable members respectively, the two recesses in said shiftable member being in communication with said low pressure port, the two recesses in said fixed member being in communication with said two working ports respectively, the recesses of said first pair communicating with each other and likewise the recesses of said second pair communicating with each other when said shiftable member is at said intermediate position, said lands being arranged to effect communication between said high pressure port and the two recesses in said fixed member when said shiftable member is at said intermediate position and to progressively restrict communication between said first pair or second pair of recesses upon shifting of said shiftable member in one direction or the opposite respectively from said intermediate position and to maintain communication between said high pressure port and the recess in said shiftable member of said second or first pair resepctively and thereby to retard pressure build-up in either of said working ports until after communication between said first pair or second pair of recesses respectively is closed by said shifting.

References Cited in the file of this patent

UNITED STATES PATENTS

| | | |
|---|---|---|
| 2,380,705 | Proctor | July 31, 1945 |
| 2,675,024 | Clark | Apr. 13, 1954 |
| 2,751,752 | Metcalf | June 26, 1956 |
| 2,796,851 | Ziskal | June 25, 1957 |

FOREIGN PATENTS

| | | |
|---|---|---|
| 231,630 | Switzerland | July 1, 1944 |